Figure 1:
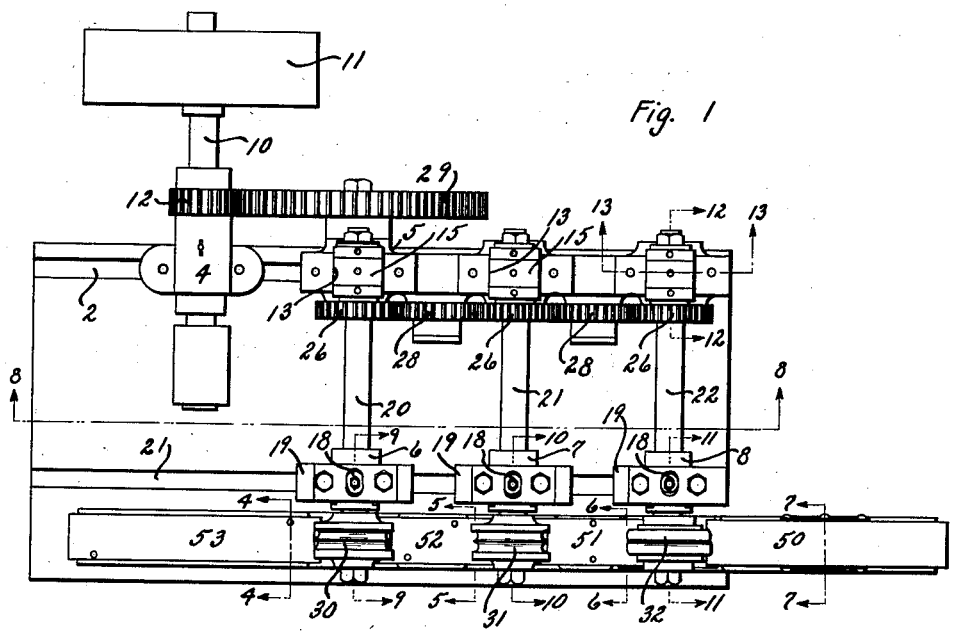

Sept. 8, 1936.    E. W. LIVENSPARGER    2,054,021
METHOD FOR PRODUCING CHANNELS
Original Filed June 14, 1928    2 Sheets-Sheet 1

INVENTOR
Edward W. Livensparger
BY
Brockett, Hyde, Higley & Meyer
ATTORNEYS

Sept. 8, 1936.  E. W. LIVENSPARGER  2,054,021
METHOD FOR PRODUCING CHANNELS
Original Filed June 14, 1928  2 Sheets-Sheet 2
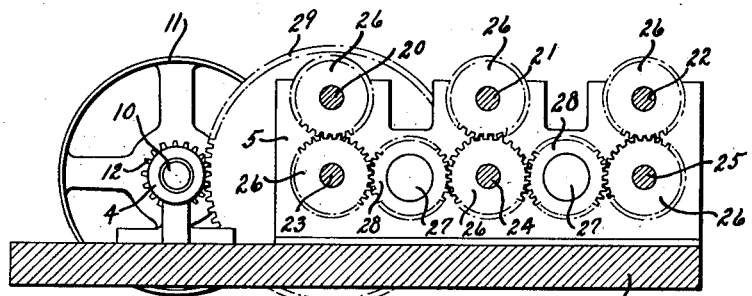
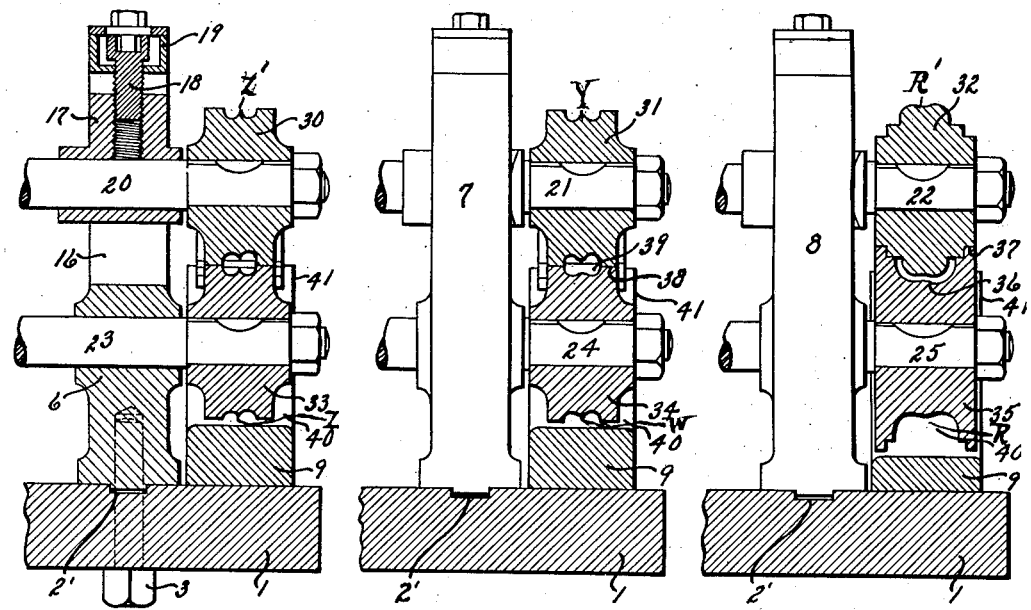
INVENTOR
Edward W. Livensparger
BY
Brockett, Hyde, Higley & Meyer
ATTORNEYS Patented Sept. 8, 1936

2,054,021

UNITED STATES PATENT OFFICE 2,054,021

METHOD FOR PRODUCING CHANNELS

Edward W. Livensparger, Cleveland Heights, Ohio, assignor of one-third to Frederick W. Watson, Cleveland Heights, Ohio, and one-third to Christopher F. Lockman, Lakewood, Ohio Original application June 14, 1928, Serial No. 285,481. Divided and this application May 28, 1930, Serial No. 456,436

3 Claims. (Cl. 154—2)

This invention relates to a method of forming so-called channel for insertion between the window glass as of an automobile and the frame in which the glass is positioned, and is a division of my application S. N. 285,481, filed June 14, 1928. Channel of the type to which reference is made is of composite construction, having a backbone member of thin resilient metal, a fabric covering, and a layer of plastic composition such as rubber interposed and vulcanized between the metal and its covering so that the metal is entirely surrounded by the composition which in turn is protected by the fabric. The channel section is generally similar to a letter C the side portions of which are adapted to yield and to flex to accommodate the channel to variations in the thickness of glass which is positioned in the opening thereof, and also for accommodation to variations in the width of the frame groove receiving the channel.

It is an object of my invention to produce such channel in the most expeditious manner possible and the invention contemplates the employment of thin flat strip steel as the backbone member, inclosing this strip in its composition covering as by an extruding process, covering the strip so formed with fabric and thereafter forming the whole into the desired channel form.

After the flat metal strip has received its covering materials, the whole, while of little strength owing to the flat form of the backbone, is of relatively considerable transverse dimension owing to the thickness of the covering, so that in order to form the same into its generally C-shaped section the strip must be handled in a very different manner than would be suitable were the metal bare. Owing to the resilient nature of the strip and its radical change in conformation from flat to C-shaped section it is necessary that the change be accomplished progressively and continuously rather than by a single operation. Should the operation be attempted, for example, in a machine having merely a series of paired forming rolls the result would be a buckling and twisting of the strip and eventual jamming thereof between the pairs of rolls, or at the best a defectively warped product. Accordingly, therefore, I preferably employ a forming machine wherein pairs of forming rolls are arranged, each pair having a clearance opening therebetween adapted to entirely confine the strip passing therethrough, the machine also having guiding dies arranged adjacent the forming rolls and extending into close proximity with the roll clearances so that the work strip is confined during its entire progress through the forming machine and even after the strip is formed into the desired channel section, in a passage of substantially unbroken walls.

Figure 3:
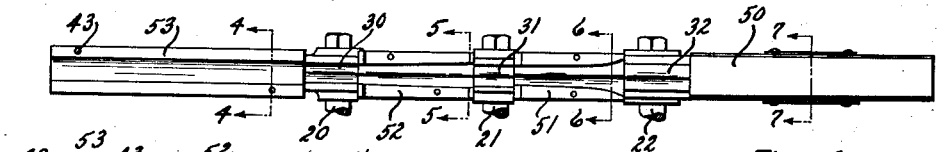

The channel section chosen for illustration is of a form in modification of the C-shape above referred to, being more like a figure 3 and it is a further object of this invention to arrange the forming machine so that the side portions of the work strip will be bent around to form the side portions of the 3-section by the forming rolls and by the guiding dies progressively, the ridge in the central portion of the 3-section, however, being produced by the rolls alone, this arrangement being for the reason that any die means by which the ridge might be produced have been found to operate with very destructive results on the fabric covering of the work strip.

Figure 2:
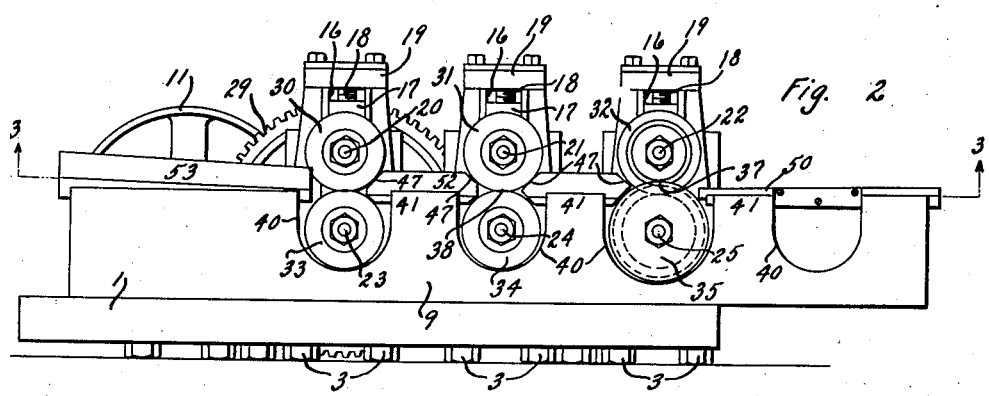

The exact nature of the invention together with further objects and advantages thereof will be apparent from the following description taken in connection with the accompanying drawings in which Figs. 1 and 2 are views in plan and side elevation respectively of the machine; Fig. 3 is a detail section as in the plane of line 3—3, Fig. 2; Figs. 4–7 inclusive are sections through the several dies as in the planes of lines 4—4 to 7—7 respectively, Fig. 3; Fig. 8 is a vertical section as in the plane of line 8—8, Fig. 1; Figs. 9–11 are vertical sections as in the planes of lines 9—9 to 11—11 respectively, Fig. 1; Figs. 12 and 13 are vertical detail sections as in the planes of lines 12—12 and 13—13 respectively, Fig. 1; Fig. 14 is an enlarged view in section of the work strip before entering the forming machine; and Fig. 15 is a similarly enlarged view in perspective of the finished product of the machine.

With reference now to Fig. 14 of the drawings, I provide a stock of thin flat spring steel strip A. I next cover this stock with a coating of plastic material B. I then cover the whole by wrapping thereabout as indicated at C, Fig. 14, a covering of fabric such as felt which may have been "frictioned" with a suitable cement for the purpose. The result is a flat work strip having a metal backbone which requires merely forming to produce the desired section indicated, Fig. 15. The forming operation I preferably accomplish before setting of the material B so that this material being at the time in plastic state, the spring of the backbone is not resisted thereby and there are, therefore, no internal stresses in the resulting product, the forming operation at the same time serving to work together the component parts of the work strip insuring a perfect bond therebetween.

Therefore, the method consists in covering a stock of thin flat spring steel with a coating of plastic material by any well known extruding process or machine, then covering this coated stock by wrapping thereabout in any well known manner a covering of fabric such as felt which may have been "frictioned" with a suitable cement, and then passing the so-called strip through suitable forming or shaping apparatus to bring the strip to the desired form or shape. Thus, by my method, the channel strip is formed in a series of steps taking place progressively.

With reference now to Figs. 1 to 13 of the drawings, 1 is the base of a suitable forming machine, being generally flat but having a pair of shallow, parallel, longitudinally extending, aligned grooves 2 and 2' upon its upper surface. Upon the base and having portions fitting these grooves are secured as by means of the screws 3, a number of brackets 4, 5, 6, 7, 8, and 9 which thus form in effect upstanding portions of the base.

In the bracket 4 is journalled a shaft 10, carrying driving means such as a pulley 11, and a pinion 12.

The bracket 5 is provided with a number of slots 13, three being shown. In each of these slots, and mounted on a pair of pins 14 for pivotal movement, is a journal box 15. Opposite each journal box, one of the brackets 6, 7, 8 is secured upon the base 1. Each of these three last named brackets is provided with a slot 16 in which is slidably mounted, for movement in the plane of tilting movement of the boxes 15, a journal box 17. Adjustment of each journal box 17 is effected by means of a screw 18 carried by a cross member 19 which closes the upper extremity of the corresponding slot 16.

Mounted in each pivoted journal box 15 and its corresponding slidable journal box is a shaft 20, 21, 22 extending each beyond its slidable journal box.

Beneath the shafts 20, 21 and 22 and mounted in the corresponding supporting brackets thereof, are corresponding shafts 23, 24 and 25 respectively. Upon each of the six shafts mentioned, and adjacent the bracket 5 is a gear 26, the teeth of those gears of each pair of vertically spaced shafts, intermeshing. Between each pair of the lower shafts 23, 24 and 25 and carried upon a stud 27 secured in the bracket 5 is a gear 28 having teeth meshing with its adjacent gears 26. The shaft 23 extends beyond the bracket 5 and carries a gear 29 meshing with the pinion 12. The gears 26 and 28 are preferably all of the same size.

Upon the end of each of the shafts 20 to 25, is a forming roll, these rolls being numbered in the drawings as 30 to 35 inclusive. Each roll is secured upon its shaft as by the key and nut indicated and the rolls are all in a common plane.

The peripheral conformation of each pair of vertically spaced rolls is such that there will be a clearance opening therebetween, and a substantially contacting pair of roll portions on each side of the clearance (Figs. 9—11). Thus the rolls 32 and 35 form therebetween a clearance 36 of substantially U-section having roll portions substantially meeting as at 37 at the pitch circles of the pair of rolls; the rolls 31 and 34 meet on their pitch circles 38 and form therebetween a clearance 39 of the bilobed section indicated; and the rolls 30 and 33 provide a clearance of section similar to that of 39 but with the lobes thereof more sharply defined.

The pitch diameters of all of the rolls 30—35 are equal to each other and to those of the gears 26; wherefore it will be apparent that upon rotation of the shaft 10 in clockwise direction, Figs. 2 and 8, the shafts 20—25 inclusive will be rotated at a uniform speed, the gears 26, shafts 20, 21, 22, gears 28 moving in clockwise direction, and the shafts 23, 24 and 25 with their gears moving in counter-clockwise direction.

The arrangement is such that the clearances between the several pairs of forming rolls are substantially aligned wherefore it will be apparent that the work strip of corresponding sectional dimension fed to the clearance between the end pair of rolls 32—35 will be fed by the motion of the rolls toward the left, Figs. 1, 2, 3, and 8, the strip being acted upon and altered in sectional form by each pair of rolls.

It will be apparent also that fine adjustment of the roll clearances may be made by manipulation of the screws 18, the upper roll, its shaft and its two journal boxes moving as a unit upon the corresponding pins 14, the upper roll moving substantially bodily in its plane; and that likewise the upper roll of each pair may if desired be widely separated from its corresponding lower roll.

The bracket 9 extends longitudinally of the base 1 in the plane of the forming rolls, having cut-away portions 40 clearing the lower rolls, and having upstanding portions 41 therebetween.

Mounted upon the bracket 9 one upon either side of each pair of forming rolls is a guide die 50, 51, 52, 53. Each die is conveniently formed of a pair of die blocks, one—45—of plain rectangular section secured upon the bracket 9 as by screws 42, the other—46—being cut-away and secured upon its corresponding plain die block as by screws 43, whereby a substantially integral guide die having a through opening is obtained. As indicated in Fig. 2, the upper die blocks intermediate the forming rolls are chamfered off as at 47 to closely approach the rolls whereby a substantially continuous confined path for the work strip, in succession through the several dies and forming roll clearances, is had.

It will be appreciated that the die openings are of graduated sectional conformation as indicated, Figs. 4–7, as are the clearances between successive pairs of forming rolls; so that the side portions of work entering the machine as a flat strip fitting the opening 48 of the first guide die 50 will be bent around gradually from the central portion thereof and the strip will finally emerge from the machine in a form as indicated in Fig. 15.

Thus the function of the first guide die 50 is primarily to guide the work strip to the first pair of forming rolls 32, 35 (shown in Figure 11), which bend the flat strip to the shape of the bow shaped clearance 36 between them, there being a slight annular central raise R, in the lower roll opposed to a slight annular depression R' in the lower roll, which serve as preliminary means for forming a central raise D, in the band shown in Figure 15. The work then passes through the second die 51, shown in Figure 6, which is graduated throughout its length, and upper die portion is provided with a central longitudinal ridge T, which bends inward, the upper edges of the work.

Next the second pair of rolls 31, 34 still further bend inwards these upper edges by means of the central annular ridge V, on the upper roll, and in addition raise the central portion of the strip to form the ridge by means of the annular central ridge W on the lower roll, whereby the work assumes a section similar to a figure 3.

Figures 4, 5, 6, 7:
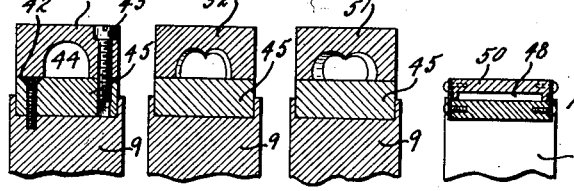

The third die 52 shown in Figure 5 further continues the operation of closing together the edges of the strip and is provided with a corresponding longitudinal ridge X, and is narrower to further compress and set the looped sides.

The last set of forming rolls, Figure 9, substantially closes the now well defined loops of the work forming thereof in section a figure 8 and the final die 53 as shown in Figure 4 maintains the shape to which the strip springs upon emerging from the last pair of rolls.

This last die is preferably tilted upwards toward its mouth as shown in Fig. 2, sufficiently so that the work which has now become the product, of channel section opening upwardly, will not "break", that is, will not bend down sharply of its own weight, as it leaves the machine.

By the arrangement described the work strip the form of which is materially altered as the same passes between each pair of forming rolls, has no opportunity to spring outwardly as it emerges from each roll clearance.

Also by the arrangement described it is possible to positively locate the dies with respect to the forming rolls as by setting the dies in a slot longitudinally extending upon the upper face of the bracket 9, as indicated Figs. 4-6; removal of the dies being made possible by my provision for raising the upper rolls from the lower rolls.

The advantage of a method as I have described resides in the fact that the coatings or coverings are applied to the spring steel stock while such stock is in a flat state and the first coating is still in plastic state before and while the spring steel stock is passed through the forming apparatus whereby such coatings will evenly cover the stock strip irrespective of its final shape and there will be no resistance to the shaping of the strip. Another advantage resides in the fact that the strip is covered with fabric before being passed through the forming apparatus so that it travels easily through the rolls and also with less wear on all forming parts.

What I claim is:

1. The method of making a composite channel strip of the character described which comprises covering a flat metal strip with a non-metallic flexible substance in a plastic state, applying a fibrous cover to said strip and shaping the flat strip progressively and continuously into channel form of uniform cross section by compressing the longitudinal edges and central portion thereof toward each other whereby to permanently distort the metal and to impart a bilobate shape to said strip.

2. The method of making a composite channel strip of the character described which comprises applying to a flat metal strip a covering of rubber, applying thereto a fibrous covering and shaping the composite strip into channel form by permanent distortion of the metal by a compressing action applied to the longitudinal edges of the strip and also centrally thereof.

3. The method of making a composite channel strip of the character described which comprises delivering a metal strip through an extruding die and covering it with a substantially uniform thickness of rubber, applying a fibrous covering thereto and shaping the composite strip into channel form of uniform cross section by permanent distortion of the metal from a flat condition by bending the opposite edges of the strip toward each other and by bending the central portion of the strip inwardly.

EDWARD W. LIVENSPARGER.